(12) United States Patent
Richley (10) Patent No.: US 7,907,065 B2
(45) Date of Patent: Mar. 15, 2011

(54) DEVICE FOR ACTIVATING INDUCTIVE LOOP SENSOR OF A TRAFFIC LIGHT CONTROL SYSTEM

(76) Inventor: Edward Anthony Richley, Gaithersburg, MD (US)

( * ) Notice: Subject to any disclaimer, the term of this patent is extended or adjusted under 35 U.S.C. 154(b) by 984 days.

(21) Appl. No.: 11/800,081

(22) Filed: May 4, 2007

(65) Prior Publication Data

US 2008/0048888 A1 Feb. 28, 2008

Related U.S. Application Data

(63) Continuation of application No. 11/511,115, filed on Aug. 28, 2006, now Pat. No. 7,432,827.

(51) Int. Cl.
G08G 1/01 (2006.01)
(52) U.S. Cl. ........ 340/941; 340/931; 340/933; 340/907; 340/917; 340/551; 340/561; 340/568.2
(58) Field of Classification Search .................. 340/941, 340/933, 939, 551, 561, 568.2, 870.31, 931, 340/907, 916, 917, 919; 342/44, 45; 702/82, 702/96
See application file for complete search history.

(56) References Cited

U.S. PATENT DOCUMENTS

| | | | |
|---|---|---|---|
| 3,943,339 A | 3/1976 | Koerner et al. | |
| 3,984,764 A | 10/1976 | Koerner | |
| 3,989,932 A | 11/1976 | Koerner | |
| 4,472,706 A * | 9/1984 | Hodge et al. | 340/941 |
| 5,057,831 A * | 10/1991 | Strang et al. | 340/941 |
| 5,242,136 A * | 9/1993 | Cribbens et al. | 246/34 R |
| 5,642,043 A * | 6/1997 | Ko et al. | 324/207.24 |
| 5,652,577 A * | 7/1997 | Frasier | 340/933 |
| 6,072,408 A | 6/2000 | Baer | |
| 7,330,132 B1 * | 2/2008 | Kauffman | 340/941 |
| 2004/0095148 A1 * | 5/2004 | Hilliard et al. | 324/654 |
| 2009/0057084 A1 * | 3/2009 | Mahawili | 191/10 |

OTHER PUBLICATIONS

A.B. Carlson, "Communication Systems", (1975), pp. 201-202 McGraw-Hill, USA.

* cited by examiner

*Primary Examiner* — Hung T. Nguyen (57) ABSTRACT

A system and method for activating vehicle sensors which are based on inductive loops. A transformer is used to couple the vehicle frame to activation circuitry. Within the activation circuitry, a voltage controlled oscillator which drives the transformer is scanned throughout the required frequency range while a balanced mixer, low-pass filter, and detector are arranged to show the presence of a signal from an inductive loop by the amplitude of the resultant signal at a difference frequency. The voltage controlled oscillator is then made to dwell at or near the frequency of the sensor loop by adjusting so as to keep the amplitude of that low-frequency difference as high as possible.

19 Claims, 4 Drawing Sheets

DEVICE FOR ACTIVATING INDUCTIVE LOOP SENSOR OF A TRAFFIC LIGHT CONTROL SYSTEM

RELATED APPLICATIONS

This application is a CONTINUATION of Ser. No. 11/511,115 filed on Aug. 28, 2006 U.S. Pat. No. 7,432,827, the disclosure of which is expressly incorporated herein by reference.

FIELD OF THE INVENTION

This invention relates to the field of automated traffic control systems, particularly those with vehicle presence sensors based on inductive loops buried beneath a roadway. More specifically, this invention relates to the field of devices for enhancing the ability of smaller vehicles to activate such sensors.

DESCRIPTION OF RELATED ART

Control of traffic signal lights by automatic vehicular sensors has become very common throughout the world, as an alternative to signal control based purely on timing.

Although many modern vehicle sensing systems are based on digital cameras with pattern recognition software, many older and less costly systems are based on detection of a change in inductance of a loop of wire buried beneath the road surface. Various such sensors have been available commercially. Some of the more widely-used models are the C800 from 3M/Canoga, and the LM302 from Eberle Design, Inc. The operation of these sensors is described, for example, in U.S. Pat. No. 3,943,339 (Koerner, Bienhoff, Henderson, Higbee, and Koerner), U.S. Pat. No. 3,984,764 (Koerner), and U.S. Pat. No. 3,989,932 (Koerner).

The basic operation of these systems relies on an inductive loop or coil of wire buried beneath the road surface, typically in a rectangular pattern with sides several feet long. This loop has some nominal inductance which will be reduced when some large metal object, such as a vehicle, is brought into proximity, according to well known laws of electromagnetism. The loop is typically placed in an oscillator circuit such that its inductance directly affects the frequency of oscillation. The sensing circuitry then monitors the oscillation frequency and indicates presence of a vehicle when some sufficiently large and abrupt change takes place in that frequency. This is accomplished by either measuring the time taken to accumulate some fixed number of oscillations, or by measuring the number of oscillations in some fixed time. Alternately, inductance change can be measured by applying a fixed frequency signal, and monitoring a phase shift or bridge imbalance as is commonly done in laboratory instruments for inductance measurement. The important common feature is that some alternating current signal, typically in the 20 kHz to 200 kHz frequency range, is applied to the loop, and that the detection is triggered by some measurable change in the frequency or phase of that current.

These systems are still very common, and can be expected to persist in more remote areas where the cost of the visual systems may not be justified. It is these less-traveled sites which present a particular problem for the operators of smaller vehicles such as bicycles and motorcycles.

Often a side-street or left-turn lane will have such a loop-based sensor. Quite often, the sensitivity of these sensors will be set such that only vehicles as large as an automobile will cause sufficient perturbation to the magnetic field of the inductive loop to activate the detector and cause the desired traffic light change. Often, this sensitivity is deliberately reduced to avoid maintenance problems associated with false triggering from large temperature changes or aging. A smaller vehicle, such as a bicycle, often will be unable to activate the sensor, or the operator must resort to such inconveniences as laying the bicycle down in the area of the loop with the hope that sufficient inductance change will result. When the main street has a large amount of traffic, and the side street or turn lane does not, the situation can be very frustrating.

Various approaches have been taken to solving this problem. Frasier (U.S. Pat. No. 5,652,577) describes a passive device consisting of a relatively large metallic mesh or foil which is to be laid over the loop so as to simulate the presence of a large metallic object. This has the major drawback of being very awkward and inconvenient.

Strang and Frus (U.S. Pat. No. 5,057,831) describes an active system consisting of two coils connected via an amplifier. One coil is used to sense the emitted alternating field from the loop, while the other is used to generate an amplified magnetic field which is then presented to the loop by magnetic induction. Thus, the system tries to create the effect of a large metallic object, which would reduce or exclude any applied field, by driving a somewhat canceling alternating field back to the loop. This system has the advantage of being active and thus smaller than the corresponding large metal object, but has the disadvantage of being limited in the sensitivity which can be provided via the gain of the amplifier before self-oscillation takes place. In order to provide more sensitivity, greater separation between the two coils would be necessary, and the device would become larger. The adverse effects of feedback between output and input are discussed in '831 and described as regeneration. Although not based on regeneration, the inventors of '831 describe it as difficult to avoid. It will be especially difficult to avoid regeneration, even with specific cancellation circuitry, across a wide range of frequencies. Furthermore, relative orientation of the two coils with respect to the loop is critical in order to ensure field cancellation.

Baer and Sunda (U.S. Pat. No. 6,072,408) describe two embodiments of active systems. In the first embodiment, a voltage controlled oscillator (VCO) is driven throughout the range of expected frequencies (20 kHz-200 kHz) and connected to a transmitter and coil intent that, for some brief instant, the frequency of the loop sensor will coincide with that of the VCO. At this point, the loop sensor circuitry will respond to the presence of an inductively coupled signal much as it would to an abrupt change in inductance. If the loop sensor circuitry is sufficiently unsophisticated, a brief perturbation in its current caused by coupling at or near its driven frequency would activate the detection circuitry.

In the second embodiment disclosed in '408, the VCO is controlled by circuitry which temporarily, or perhaps periodically, shuts down the transmitter and attempts to measure the actual frequency emitted by the loop sensor. With this measurement, the transmitter is then set to a similar frequency so that it can dwell on or near the correct frequency so as to further enhance activation. These embodiments both suffer from difficulties associated with some of the more advanced aspects of loop sensor technology as described below.

In most modern implementations, loop sensor technology implements a time-sharing approach to vehicle presence detection. There are several reasons for this, but the primary reason is that a single intersection might have many detection zones. For example, there may be two left-turn lanes with need to distinguish between vehicle presence in each. By time-sharing the loop-sensing function, interaction between two adjacent loop sensing circuits can be avoided. Each loop is periodically activated for a brief time "window" (typically 5 ms to 50 ms), followed by a large interval of inactivity during which time other loops can be activated. During that activation window, the loop receives a brief "burst" of high-frequency signal and detection determination is made during that burst time. Adjacent loops will be activated in sequence, so that never will two be activated at the same time, and the possibility of inadvertent interaction and false-triggering is eliminated.

Additionally, many installations will have timing requirements such that a vehicle must be detected for a significant duration of time (a dwell time) before activation occurs. This is to ensure that a signal light change is required, and that the vehicle didn't just briefly trigger the detector and then make an unusual move (such as a last-minute lane change or, worse, a red signal transgression). Furthermore, some intersections require that a first loop sensor be activated before a vehicle dwells on a second sensor as if to ensure that the vehicle actually approached from the approved direction.

For these reasons, the devices of Baer and Sunda would have difficulties. The first embodiment would not provide a sufficient duration of detection for those systems requiring a dwell time. The second embodiment would have difficulty with the large number of systems which employ time-sharing. In order to capture the frequency of the loop sensor oscillator, their embodiment sampled an input from an inductively coupled coil for some time interval and counted the cycles received. With a time-shared signal, which is not continuous but only present during some low duty cycle, the time interval of the measurement must be somehow matched to that of the loop sensor burst so that the instantaneous frequency of the burst can be measured. This would undoubtedly require measurement circuitry far beyond what is disclosed in the '408 patent, especially since burst durations vary from system to system.

In my copending application, Ser. No. 11/511,115, the entire disclosure of which is included herein by reference, a system utilizing a single coil is disclosed. That system simultaneously transmits and receives while sweeping frequency until a beat frequency is detected. The transmitted frequency is then made to dwell at the frequency where the amplitude of the beat is greatest, and, hence, near that of the inductive loop sensor. The result is that the inductive loop sensor is affected so as to indicate the presence of a vehicle.

Both Strang and Frus and Bear and Sunda disclose the use of separate coils for receiving and transmitting. Copending application Ser. No. 11/511,115 discloses the use of a single coil used for both transmitting and receiving. As these coils must be located close to the pavement, the use of any coils at all causes difficulty and inconvenience as it adversely affects ground clearance and introduces a protruding object susceptible to damage from road debris.

SUMMARY OF THE INVENTION

The present invention avoids the use of extraneous coils by utilizing the metal frame of the vehicle, itself, as the transmitting and/or receiving loop. This utilization is accomplished through the use of a transformer which has an explicit primary winding, and is positioned so that a portion of the vehicle frame acts as the secondary winding. The vehicle frame consists of one or more closed paths of metallic conducting tubing and so forms an inductor arranged to have substantial mutual coupling to the inductive sensor loop beneath the pavement. By tight magnetic coupling in the transformer, the inherent inductor formed by a portion of the vehicle frame is electrically reflected back into the circuitry of an activation device, thus coupling the activation device to the loop sensor. The coupling thus achieved works to not only couple the output signal from the activation device to the loop sensor, but also to couple the signal generated by the loop sensor back into the activation device.

Since the present invention makes the improvement over the prior art of utilizing the vehicle frame as the transmitting and receiving loop, it is necessary to use it in conjunction with an activation device which requires only a single loop for both transmitting and receiving. This is most readily accomplished through the use of techniques outlined in copending application Ser. No. 11/511,115, the adaptation of which is outlined below.

An output signal of large amplitude is applied to the primary winding of the transformer. The frequency of the output signal is brought close to that of the loop sensor by adjusting a VCO while simultaneously monitoring the difference frequency signal derived by heterodyne mixing of the generated signal with the signal from the loop sensor. This difference frequency signal is processed through a low-pass filter designed to only allow signals of sufficiently low frequency to be amplified. When the frequency of this mixer product is within the passband of the low-pass filter, its amplitude is measured in a detection process, and averaged over a time period corresponding to many cycles of the time sharing described above. This measurement is performed by a small controller, such as a microcontroller, configured to also correct the frequency of the VCO so as to maximize the amplitude of the signal at the difference frequency. In this manner, a frequency very close to that of the loop sensor is found, and a signal at that frequency is simultaneously retransmitted to the loop sensor over an arbitrarily long dwell time. By proper choice of the corner frequency of the low-pass filter, the difference between the loop sensor frequency and resultant VCO frequency can be made small enough for activation of the vehicle presence detection circuitry to occur.

In contrast with prior art activation techniques, the present invention simultaneously transmits while monitoring its frequency relative to that of the loop sensor. There is no need for a pause in operation to measure the loop sensor frequency. Furthermore, by the use of a balanced mixing arrangement, a single coupling element can be used and there is no need for a second inductive coupling coil for communication with the loop sensor.

A further major benefit of the present invention is that the sensitivity is not limited by stability concerns. By using the heterodyne mixing principle, gain is applied only to signals at the difference frequency. This difference frequency, when present, is far below the operating frequency of the loop sensor or transmitter, and so there is no need to keep the outgoing signal separated from the incoming signal, aside from the amount of isolation required for proper operation of the mixer. As a result, this gain can be quite high, as can the sensitivity, while the output amplitude is kept at its maximum value throughout the operating cycle, regardless of distance from the sensor loop.

Furthermore, there is no need for a circuit according to the present invention to calibrate its VCO in order for an input frequency measurement to be mapped to an appropriate VCO setting. By virtue of the heterodyne mixing and low-pass filtering, the VCO frequency which leads to significant amplitude of a signal at the difference frequency is automatically very close to the frequency of the loop sensor.

A further benefit of the present invention is that time-shared signals with even modest duty cycles are easily accommodated by ensuring that the time constant of the amplitude detection circuitry is sufficiently large. This serves to average out the effects of the short bursts in such a manner that the actual timing of the bursts is irrelevant.

DETAILED DESCRIPTION OF THE INVENTION

Figure 1:
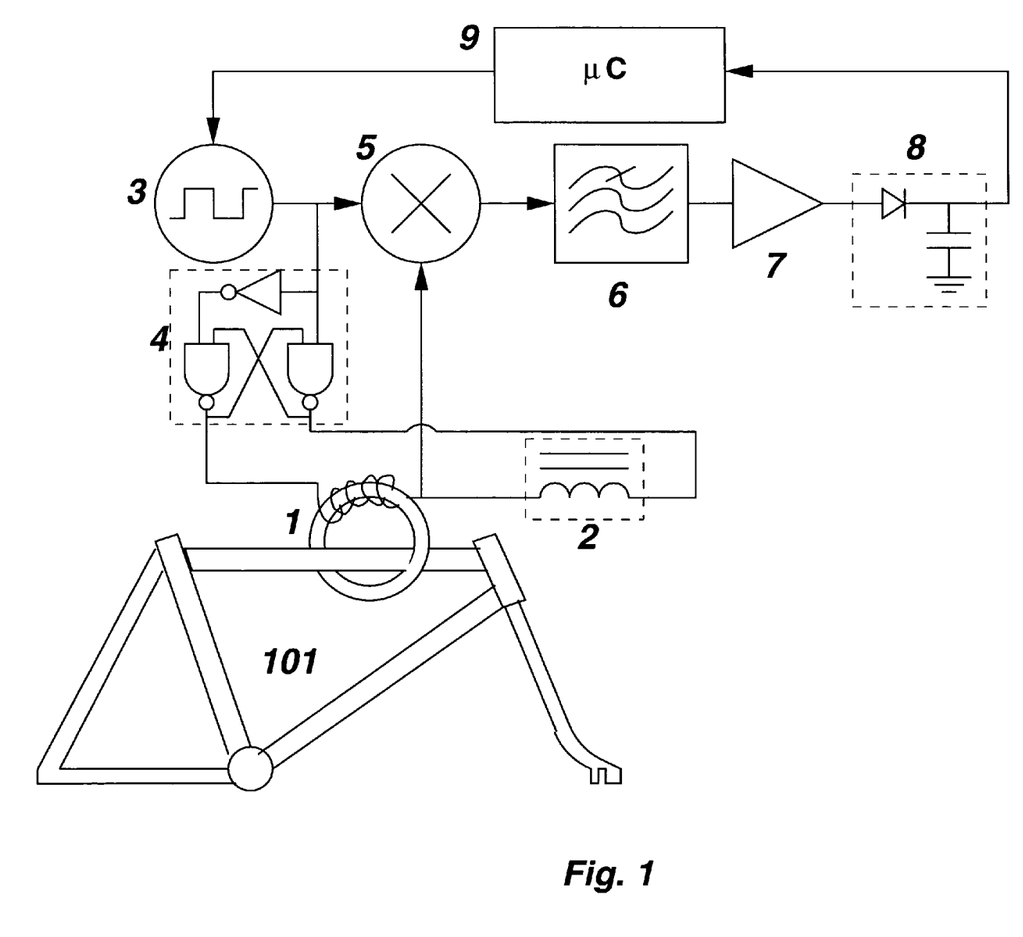
FIG. 1 shows a block diagram of a basic activation device according to the invention, showing transformer 1, inductor 2, VCO 3, balanced drive circuitry 4, balanced mixer 5, low-pass filter 6, amplifier 7, detector 8, microcontroller 9, and vehicle frame 101.

FIG. 1 shows a block diagram of an exemplary embodiment of the invention. Transformer 1 serves to both carry the high-power output signal being sent to the bicycle frame, as well as to transfer the much weaker signal emitted by the sensor loop back to the activation electronics. Balanced drive circuitry 4 takes the signal from VCO 3, which is constrained to have a frequency covering all the expected operating frequencies of loop sensors (typically 20 kHz-200 kHz) and applies it to both the primary winding of transformer 1 and inductor 2. Transformer 1 consists of approximately 8 turns of copper foil wound on a split toroidal ferrite, approximately 2 inches in overall diameter. It has been found that a practical value for the inductance as measured at the primary winding of transformer 1 is 50 microhenries. Thus, the magnetization inductance of transformer 1 should be substantially larger than this value, so that maximal current is transferred into vehicle frame 101. Inductor 2 is wound on an iron-powder toroidal form and also has an inductance of approximately 50 microhenries. The field of inductor 2 should be kept substantially isolated from vehicle frame 101 so that little mutual inductance exists between the two. In this manner, substantially out-of-phase signals applied to transformer 1 and inductor 2, as connected in series, will produce little signal at the output frequency at their common terminal.

In practice, some imbalance will occur, and the common connection point will contain some amount of the output signal. However, this will not adversely affect the operation of the circuit as long as it is sufficiently low as to keep mixer 5 from becoming desensitized.

Meanwhile, vehicle frame 101, when placed in proximity to an active sensor loop, will introduce some amount of signal at the frequency of the sensor loop in the closed-path portion of vehicle frame 101, a portion of which comprises the secondary winding of transformer 1, and by its strong coupling to its primary winding, this signal will be present at the common terminal with inductor 2 and, hence, at the first input to mixer 5. The second input to mixer 5 comes directly from VCO 3 and hence carries a large signal with a frequency corresponding to the output frequency. Mixer 5 then mixes these two signals in a heterodyne process to produce both sum and difference frequencies at its output, according to methods well known in the design of radio receivers (See, for example, Carlson, A. B. "Communication Systems", pp. 201-202, McGraw-Hill 1975).

Low-pass filter 6 then substantially attenuates all but the difference frequency signal. When that difference frequency is within the passband of low-pass filter 6, namely less than approximately 2 kHz, it is amplified by amplifier 7 and presented to detector 8. Detector 8 can be much like the detector found in inexpensive AM radio receivers, commonly known as a peak detector. Its output is a slowly varying representation of the amplitude of its input. When the low frequency alternating signal, derived from the frequency difference, is presented to detector 8, its output voltage rises. That is, the difference frequency of a few hundred to a few thousand Hertz at the input to detector 8 causes its output to quickly rise to some positive voltage, which decays relatively slowly after the input signal is removed. As a result, even low duty-cycle time-shared bursts of high frequency signal presented to vehicle frame 101 and, hence, transformer 1 will result in some rise in voltage at the output of detector 8 which, although unsteady, will remain above zero for a time substantially longer than the cycle time of the time-sharing sequence.

Output from detector 8 is presented to microcontroller 9. Ideally, microcontroller 9 contains an analog-to-digital converter which can, under software control, measure the output voltage of detector 8. Microcontroller 9 also contains a digital-to-analog converter (DAC) which is connected to VCO 3.

The software executed by microcontroller 9 is designed to slowly scan the output of its DAC through the range of voltages corresponding to the range of frequencies (typically 20 kHz-200 kHz) expected for loop sensor operation, according to the operation of VCO 3. When some, albeit small, indication of a beat frequency signal is indicated by detector 8, the software then immediately stops the scanning, and implements any of various algorithms for fine-tuning the output frequency to closely match or dither around that of the input. In this manner, the frequency or phase measurement circuitry in the loop sensor is presented with an abrupt perturbation and, if the perturbation is sufficiently strong, a sensor activation will result.

Figure 2:
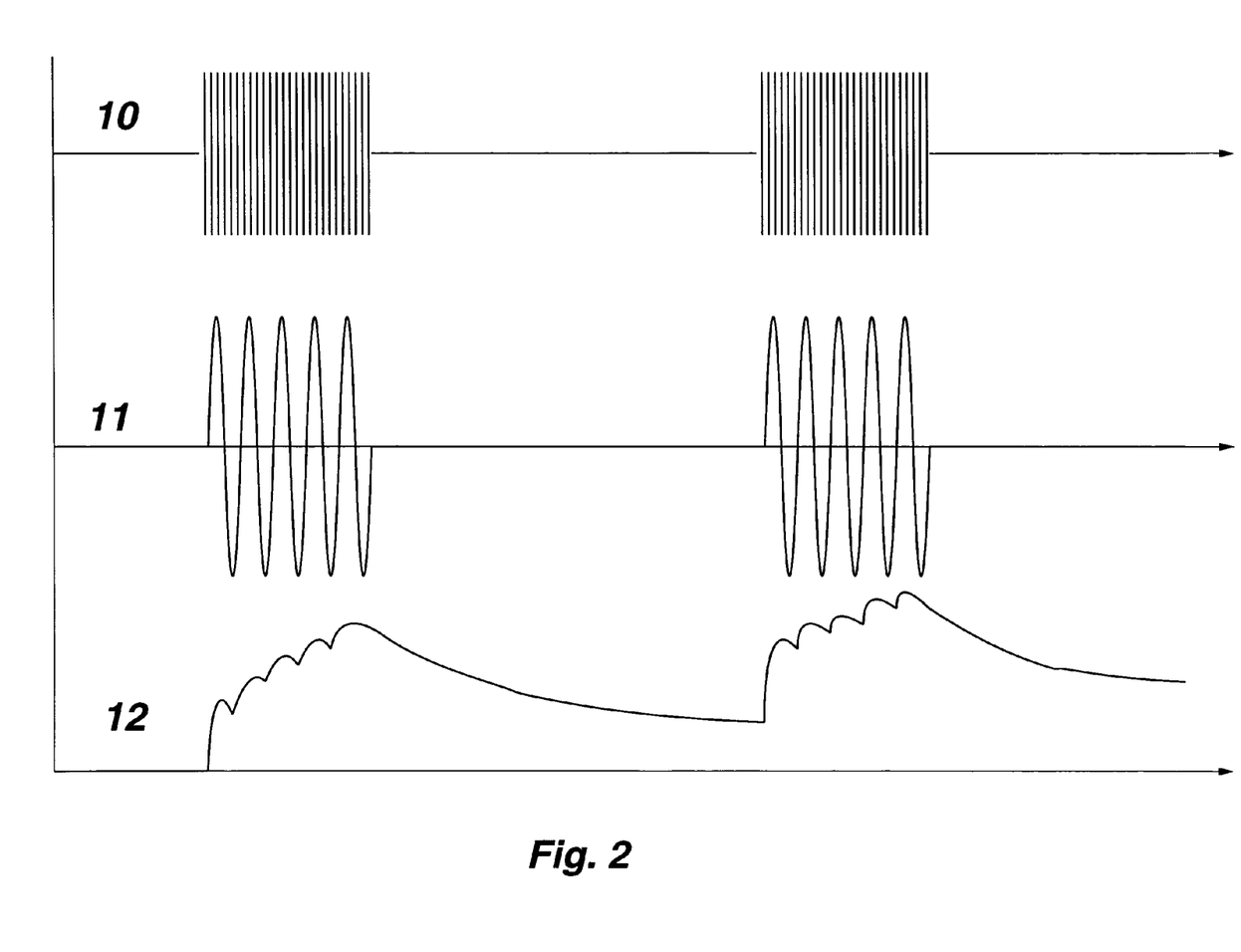
FIG. 2 shows a representative time-shared loop sensor signal 10, corresponding beat frequency signal 11, and detector output 12.

FIG. 2 shows three signals corresponding to the acquisition of an input signal. Shown at 10 is a periodic burst of high frequency signal, as would be derived from vehicle frame 101 via transformer 1 in the presence of a time-shared sensor loop. At 11 is shown the beat signal, as filtered by low-pass filter 6 and amplified by amplifier 7. This signal consists of a relatively small number of cycles of the difference frequency corresponding to the difference between the input signal from a loop sensor and the instantaneous frequency of VCO 3. At 12 is shown the output of detector 8 corresponding to signal 11. A positive voltage is built up quickly and decays over a time somewhat longer than the inter-arrival time of input bursts.

Figure 3:
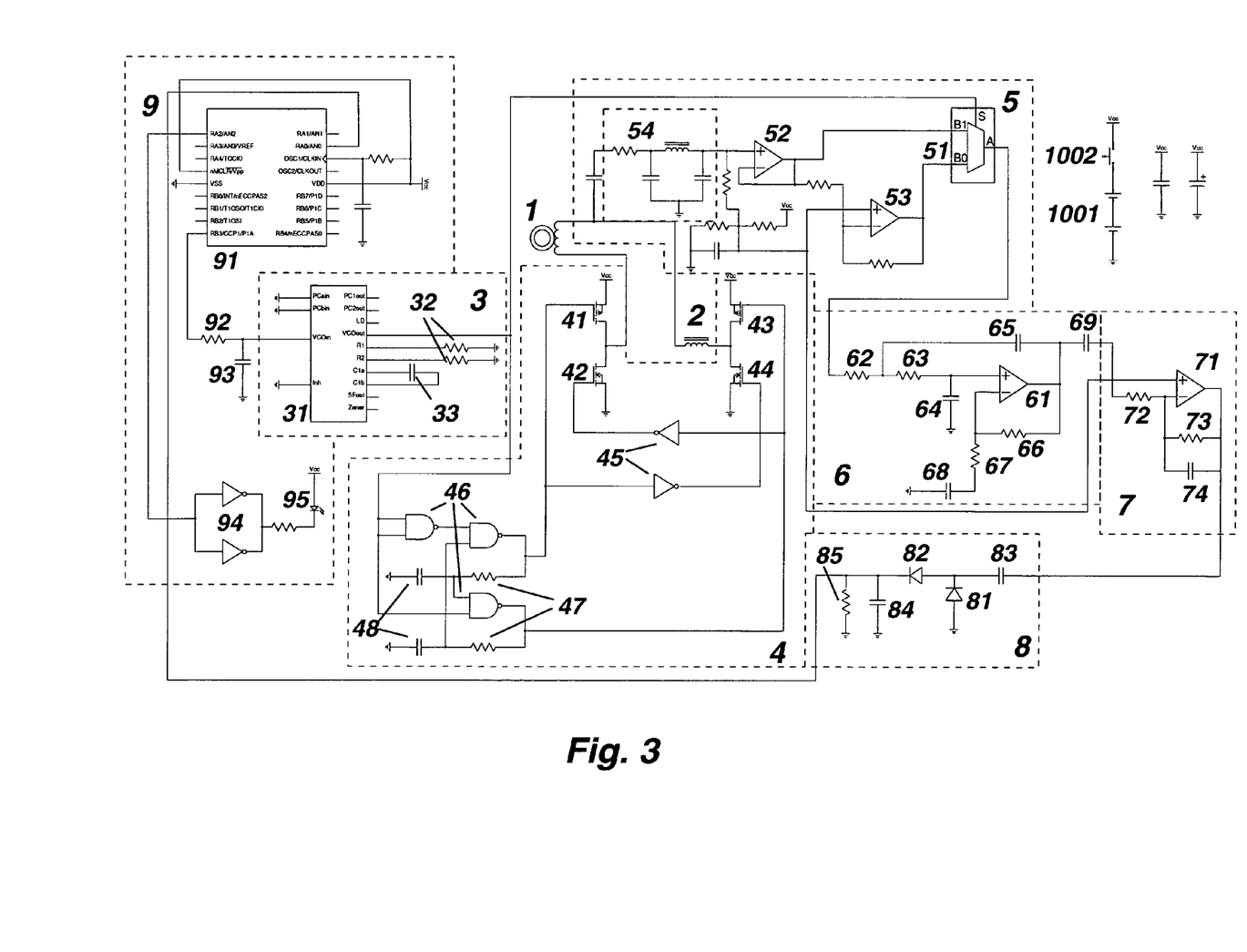
FIG. 3 shows details of an exemplary embodiment of the invention.

FIG. 3 shows details of a preferred embodiment. VCO 3 is implemented as a CMOS integrated circuit (IC) 31, such as the MM74HC4046M from Fairchild Semiconductor Corporation. Its control voltage input is derived from the filter consisting of resistor 92 and capacitor 93. Microcontroller IC 91 can be, for example, a PIC16F716 from Microchip Corporation, which has a pulse-width modulation controller internally configured to operate as a low-cost digital-to-analog converter (DAC) by the use of resistor 92 and capacitor 93. VCO IC 31 is configured with resistors 32 and capacitor 33 so that its frequency varies from 20 kHz to 200 kHz when its input control voltage is driven over the entire range of voltages from this DAC output. In this manner, microcontroller IC 91 can control the frequency of VCO 3 over the full range of required operating frequencies.

The output of VCO 3 is connected to balanced drive circuit 4 comprising logic gates 45 and 46, MOSFET driver transistors 41, 42, 43, and 44, and timing components in the form of resistors 47 and capacitors 48. Logic NAND gates 46, for example the SN74HC00D from Texas Instruments Corporation, form a non-overlapping complementary drive circuit in conjunction with resistors 47 and capacitors 48. In this configuration, each output substantially represents the complement of the other, except for a brief time, typically several hundred nanoseconds, around the transition time. During this interval, both outputs are held high, thus ensuring that there is a small window of time between one output going high and the other going low. These outputs then drive p-channel enhancement MOSFETs 41 and 43, and, through the use of inverters 45 (for example the SN74HC04D from Texas Instruments Corporation), n-channel enhancement MOSFETs 42 and 44.

P-channel enhancement MOSFETs 41 and 43 are, for example, of type NDS332P from Fairchild Semiconductor Corporation, while N-channel enhancement MOSFETs 42 and 44 are, for example, of type NDS331N also from Fairchild Semiconductor Corporation. Both of these devices are capable of very large drain currents, as each has a typical on-resistance of less than 1Ω. As a result, it is important that each complementary pair, 41 and 42 or 43 and 44, not be driven in such a manner that both devices of the pair are turned on at the same time. This is the reason for the non-overlapping drive circuit outlined above. It prevents unnecessary current flow, potentially draining an operating battery or damaging the devices.

Transistors 41, 42, 43, and 44 form what is commonly referred to as an H-bridge. Each common connection of a complementary pair is substantially opposite in phase to the other. Thus, aside from the brief non-overlap time described above, when the connection between MOSFETs 41 and 42 is low, that between 43 and 44 is high, and vice-versa. A very large amount of current, however, can be delivered to whatever load is connected between the pairs. As they are driven from logic gates 45 and 46 and, in turn, from IC 31, the voltage across the H-bridge will be a roughly square wave signal with a frequency corresponding to that of IC 31.

Across the output of this H-bridge is placed the primary winding of transformer 1 and inductor 2. Inductor 2 can be a toroidal inductor of the type used in switching power supplies, such as the model 2209-H from J. W. Miller Magnetics division of Bell Industries. By choosing the inductance of inductor 2 to be substantially the same as the inductance seen at the primary of transformer 1 when loaded by the closed-path portion of vehicle frame 101, the voltage at the common connection between transformer 1 and inductor 2 exhibits relatively little of the drive signal.

Vehicle frames such as those commonly used for bicycles generally are de-signed with some form of a triangular loop comprising of the top tube, stem tube, down tube, and head tube. The typical "diamond frame" typically has a dimension of 50-60 cm (20-24 inches) along the seat tube, with similar lengths for the top tube and down tube. Frames are typically made from metallic tubing, either steel or aluminum, with a typical tubing diameter of 30 mm (1.2 inches). Although many sizes of frame and tubing are used, these dimensions are representative of the vast majority of bicycles intended for use on public roads.

The main triangle of a diamond frame can be considered to be a loop with some inductance. It is very difficult to accurately calculate this inductance for a given frame, and there is little reason to do so given the variety of dimensions and shape variations which abound. However, in order to obtain a rough estimate the amount of inductance, it is instructive to determine the inductance of a circular loop of similar size made from similar tubing. Many formulas exist for calculating the inductance of a circular loop, but a particularly simple one is given in "Reference Data for Radio Engineers", Howard W. Sams, 1975, p 6-9, as:

$$L = \frac{a}{100}(7.353 \log_{10}(16a/d) - 6.386)$$

where L is the inductance (in microhenries), a is the mean radius of the circular loop (in inches), and d is the tubing diameter (in inches). The inductance of a loop with 20 inch diameter and 1.2 inch tubing is approximately 1.2 microhenries. Thus, as a rough estimate, the primary triangle of a diamond frame will have approximately 1 microhenry of inductance. This inductance varies only slightly greater than linearly with frame dimension. The vast majority of bicycle frames fall within a few inches of each other, so that this estimate can be considered applicable to a wide selection of bicycle frames.

Transformer 1 is made from a split toroid of ferrite material, encircling one of the tubes of the main triangle. The toroid is split into two C-shaped sections so that it can be placed around a section of the frame. This technique of split toroids is well known in the art and is commonly used where ferrite toroids are used for the suppression of unwanted signals on pre-existing cables. In contrast, the present invention utilizes the split toroid in order to couple desired signals to and from the vehicle frame. The frame triangle then forms the single-turn secondary with a load of approximately 1 microhenry. The practical value of inductance as seen by the activation device has been chosen to be 50 microhenries. Thus, an impedance transformation of 50 is needed from transformer 1. Since impedances of a tightly coupled transformer are proportional to the square of the turns ratio, a primary of 7 turns is needed. In practice, 8 turns been found to provide a better match to the chosen inductor 2. The core of transformer 1 is made from a high permeability ferrite material, such as type W from Magnetics Corporation, and is large enough to encircle the typical frame tubing. One possible choice is part number ZW-44916TC from Magnetics Corporation. The high permeability ensures strong coupling between primary and secondary windings of transformer 1, and also raises magnetization inductance such that magnetization current is negligible. The toroid is split into two C-shaped half-circles so that they can be placed around one of the frame tubes and then held together with some variation of a band clamp. The half-circular sections can be made from either sawing apart a complete toroid or, preferably, they can be cast into the semi-circular shape. The four resulting faces should be then polished to ensure intimate contact for best magnetic coupling.

The size of the typical bicycle frame introduces a sufficiently large magnetic path length that a substantial part of its field overlaps with that of a typical loop sensor. It also introduces a further complication in that broadcast radio signals are also induced by it and brought into the subsequent mixer circuitry. As these radio signals are typically from the AM broadcast band (535 kHz-1605 kHz), their deleterious effects are generally due to harmonic products of VCO 3 as generated by mixer 5. As such, they can be substantially reduced by the introduction of low pass preselection filter 54 connected between the common connection of transformer 1 and inductor 2 and amplifier 52.

Preselection filter 54 is typically a low-pass filter designed to pass with minimal attenuation the desired range of frequencies expected from loop sensors (typically 20 kHz to 200 kHz) while maximally rejecting signals with frequencies outside this band. For purposes of rejecting AM broadcast band signals, pre-selection filter 54 can be implemented as a low pass filter with corner frequency at about 300 kHz. Design of this type of low pass filter is well known to persons of ordinary skill in the art, and there are many varieties from which to choose. For example, a passive 3-pole low pass filter with a 1 dB ripple Chebyshev response will suffice for most conditions one is likely to encounter. Design of such networks is discussed in "Network Analysis and Synthesis" by Louis Weinberg, McGraw-Hill 1962.

Operational amplifiers 52 and 53, such as the MCP6284 from Microchip Corporation, buffer the signal at the output of low pass preselection filter 54 at the common connection of transformer and inductor 2, and form its inversion. Multiplexer 51 can be, for example, the SN74LVC1G3157DBV from Texas Instruments, Corporation. The inputs to multiplexer 51 are thus 180-degrees out of phase with respect to each other, and allow multiplexer 51 to act as a balanced mixer. The control signal for multiplexer 51 is taken from the output of IC 31 and, hence, VCO 3. Any residual signal at the frequency of VCO 3 present at the input to multiplexer 51 will then be synchronously converted to D.C. and removed afterward by suitable coupling. By this action, the residual output signal present at the common connection of transformer 1 and inductor 2 is prevented from being applied to the following amplification circuitry.

However, any other signal generated by vehicle frame 101, as derived from mutual coupling to a sensor loop, will result in a mixer product at the output of multiplexer 51. This product will contain the difference frequency between that of VCO 3 and that of the sensor loop. This signal is then presented to low-pass filter 6.

Low-pass filter 6 is comprised of operational amplifier 61, possibly of the same type as 52 and 53 (although its frequency response need not be nearly as high as those), and various resistors and capacitors to make an active low-pass filter with an upper cutoff frequency of a several kHz. The output coupling, via capacitor 69, and bias circuitry, via resistors 66 and 67 and capacitor 68, are such that there is also a low-frequency cutoff frequency chosen to be a few hundred Hz or below. This is what serves to remove the synchronous mixer product described above, but is easily chosen to be so low as to not adversely affect the operation of the circuit.

The output of low-pass filter 6 is connected to amplifier 7, comprising operational amplifier 71, possibly of the same type as 61, resistors 72 and 73 which determine its gain, and stabilizing capacitor 74. The output of this stage is then a highly filtered and amplified version of the difference frequency signal as generated by the output of VCO 3 and whatever input signal might be present. Signal 11 of FIG. 2 depicts this output in the presence of a pulsing input signal with frequency sufficiently near to that of VCO 3.

Detector 8 utilizes two Schottky diodes, such as the type BAT54 from Vishay Semiconductor Corporation. Capacitor 84 and resistor 85 serve to set the decay rate of this detector, and is set to provide decay over some tens of milliseconds. Output from detector 8 goes to the analog-to-digital input of microcontroller IC 91.

Figure 4:
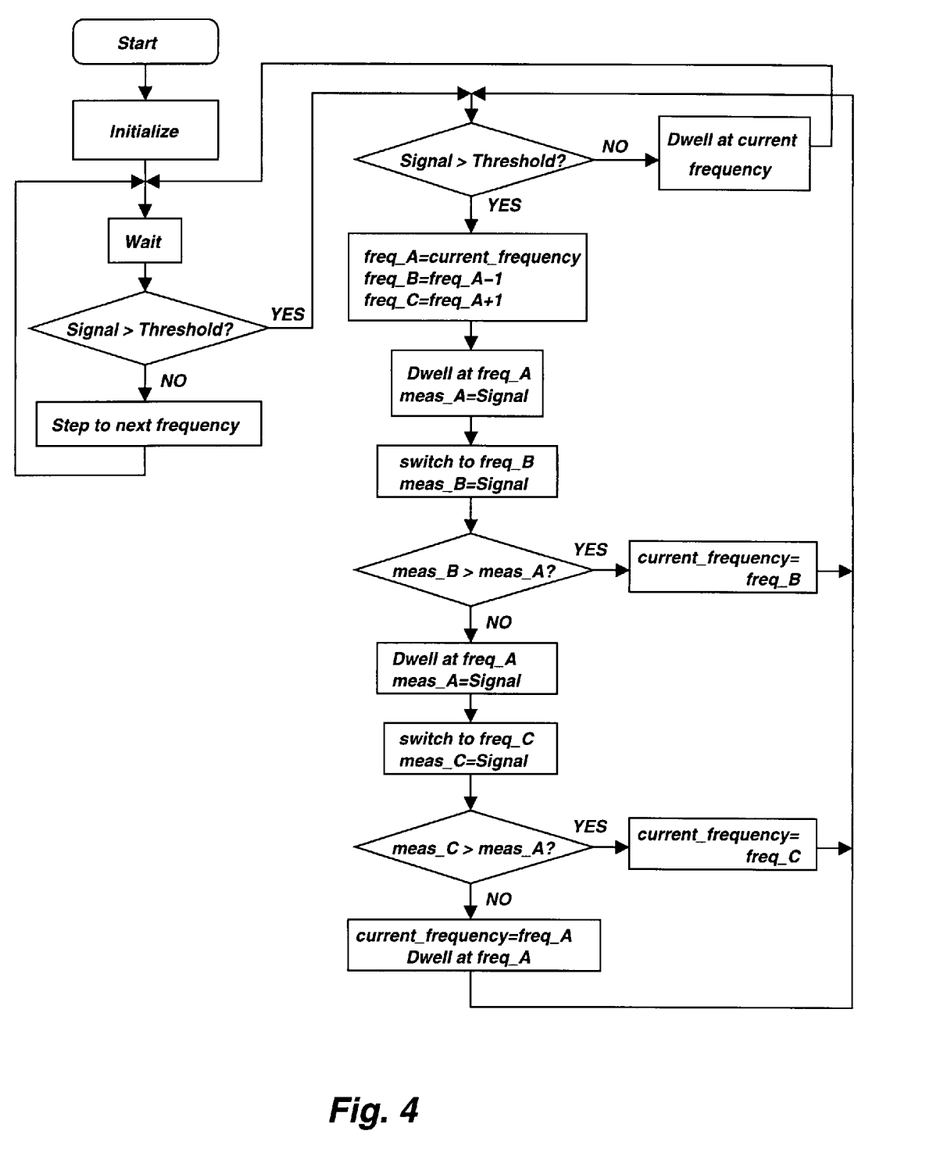
FIG. 4 shows a flowchart of an exemplary embodiment of the algorithm used by microcontroller 9.

FIG. 4 shows a flowchart of a typical program to be executed by microcontroller IC 91. At power-up, initialization of all control bits and timing registers takes place, and then the program enters into a software loop which consists of a short wait of several milliseconds, a test of its input for presence of signal, and barring the detection of one, a step to the next frequency, either increasing or decreasing. In this manner, the microcontroller effectively scans through all relevant frequencies, in an increasing and then decreasing direction, until some signal is presented to vehicle frame 101 which generates an output from detector 8 which is above some pre-determined threshold.

Upon detection of some event, indicating a nearby sensor loop, another software loop is entered which attempts to dwell at or near the frequency of the discovered signal, and to possibly improve the frequency of VCO 3 to more closely approach that of the input. As shown in FIG. 4, when a signal is detected, control flows to the right and enters a second test to ensure that the signal remains present. Assuming it does, three frequency values are computed. The first is the DAC value corresponding to the current frequency where signal was discovered. The second is one increment below that of the current frequency, and the third is one increment above.

The loop proceeds by first dwelling at the current frequency, and taking a long average of the amplitude of the output of detector 8, with many samples over a period greater than 100 ms. VCO 3 is then set to the second frequency, still close to the original, and a similar long average reading of amplitude is taken. If this amplitude is greater than that at the first frequency, the second frequency becomes the current frequency, and the loop begins again.

If the amplitude as measured for the first frequency is greater than that of the second, then the third frequency is tried. If its measurement is greater than that of the first, the third frequency becomes the new current frequency, and the loop begins again. If not, then the original frequency is retained and the loop begins again.

If, during the test at the beginning of this second software loop, the input signal disappears, the current frequency is retained for some amount of time (for example, 200 ms), and control is returned to the original software loop. In this manner, a brief lapse in signal, such as is encountered when moving between a first and second loop sensor as found in some intersections, will not necessarily lead to a completely new search, with its associated delays, and possible loss of detection by the loop sensor circuitry.

The software is designed to scan sufficiently slowly that a detected signal is not passed over by the time the second software loop is entered. That is, the response speed of the DAC and its output filter, as well as that of detector 8, must be factored in to the scanning speed of the first software loop. It is possible to implement a variation of this program in which scanning happens at a faster rate, but which would require a modification of the second software loop to go back a few steps to find the frequency at which the detection actually occurred. Many such speed improvements can be implemented with more sophisticated software and/or hardware.

In practice, it is found that an important advantage is obtained by performing the scanning primarily in the direction of decreasing frequency. That is, the initial frequency at activation should be at the high end of the range of possible frequencies, and the scan steps should each act to decrease the frequency while the system searches for output from detector 8. Upon reaching minimum frequency, in the absence of output from detector 8, the frequency is made to jump back to the highest frequency and, after a short pause to allow any transients caused by the large frequency jump to decay, step-by-step scanning in the direction of decreasing frequency resumes. The advantage of scanning in the direction of decreasing frequency is due to the possibility of having a false detection due to mixing of the incoming signal from the loop sensor with a harmonic of the VCO frequency. When mixer 5 is implemented with such circuitry as multiplexer 51, the third harmonic of the output signal of VCO 3 can cause a substantial beat frequency signal to be generated when an input signal is present. However, no such false detection can be expected from the third harmonic of the loop sensor signal mixing with the fundamental of VCO 3, since signals from loop sensors are generally sinusoidal and have very little harmonic content. Thus, by scanning primarily in the direction of decreasing frequency, the first detector output to be encountered will be most likely that for which the fundamental VCO frequency is close to that of the loop sensor. In this manner, the stronger fundamental VCO signal is available to interact with the loop sensor and inadvertent operation with the weaker harmonics is substantially avoided.

In an alternate embodiment, for use with a non-conducting vehicle frame, a copper wire, or a strip of copper tape, is laid along a the frame in such a manner as to form a closed path. This closed path may include the large triangular loop of a bicycle frame, including the top tube, head tube, down tube, and seat tube, but may also be made larger by running along the top tube, head tube, down tube, chain stay and seat stay. The ends are then joined to form a complete loop. This conducting path would then exhibit substantial mutual coupling to a loop sensor beneath the road surface in much the same manner as would a closed path of a conducting frame. The same type of transformer is then used to couple detection circuitry to this conducting loop in the same manner as for a conducting frame. In this manner, bicycle frames made from carbon fiber composites, which are non-conducting, can be adapted to use the invention.

It should be understood that numerous changes in details of construction and the combination and arrangement of elements and materials may be resorted to without departing from the true spirit and scope of the invention as hereinafter claimed.

The invention claimed is:

1. A system for activating a traffic presence sensor of the type based on an inductive loop, the system comprising:
    a vehicle frame having one or more closed conductive paths and
    a transformer having an explicit primary winding and adapted for magnetic coupling to a portion of said vehicle frame
    wherein
    said portion of said vehicle frame forms a secondary winding of said transformer and at least one closed conductive path of said vehicle frame has substantial mutual coupling with said inductive loop.

2. The system according to claim 1, further comprising:
    a preselection filter.

3. The system according to claim 1 wherein said vehicle frame is a bicycle frame.

4. The system according to claim 1 wherein said vehicle frame is a motorbike frame or a moped frame.

5. The system according to claim 1 wherein said vehicle frame is a motorcycle frame.

6. A system for activating a traffic presence sensor of the type based on an inductive loop, the system comprising:
    a vehicle frame;
    a transformer coupled to said vehicle frame;
    an oscillator coupled to said transformer;
    a mixer coupled to said oscillator and to said transformer;
    a filter coupled to said mixer;
    a detector coupled to said filter which detects an output of said filter; and
    a controller which controls the frequency of said oscillator based on measurements taken from an output of said detector.

7. The system according to claim 6, wherein:
    said filter comprises a low-pass filter.

8. The system according to claim 6, wherein:
    said oscillator is a voltage controlled oscillator.

9. The system according to claim 6, wherein:
    said controller comprises a microcontroller.

10. The system according to claim 6 wherein:
    said mixer is a balanced mixer.

11. The system according to claim 6 wherein:
    said mixer and, said filter are configured so as to generate a signal having a frequency equal to a difference between the frequency of said oscillator and that of a nearby traffic presence sensor.

12. The system according to claim 11 wherein:
    said detector is configured to generate an output which is related to the amplitude of said signal generated from said mixer and said filter.

13. The system according to claim 12 wherein:
    said controller comprises a microcontroller; and
    said microcontroller executes a program which continually adjusts the frequency of said oscillator so that said output of said detector dwells at or near that value which indicates maximum possible amplitude of said signal.

14. An apparatus for activating a traffic presence sensor of the type based on an inductive loop, comprising:
    a transformer having an explicit primary winding and adapted to accept a portion of a vehicle frame as a secondary winding;
    an oscillator coupled to said transformer;
    a mixer coupled to said oscillator and to said transformer;
    a filter coupled to said mixer;
    a detector coupled to said filter which detects an output of said filter; and
    a controller which controls the frequency of said oscillator based on measurements taken from an output of said detector.

15. The apparatus according to claim 14 wherein:
    said mixer and said filter are configured so as to generate a signal having a frequency equal to the difference between the frequency of said oscillator and that of a nearby traffic presence sensor.

16. The apparatus according to claim 15 wherein:
    said detector is configured to generate an output which is related to the amplitude of said signal generated from said mixer and said filter.

17. The apparatus according to claim 16 wherein:
    said controller comprises a microcontroller and
    said microcontroller executes a program which continually adjusts the frequency of said oscillator so that said output of said detector dwells at or near that value which indicates maximum possible amplitude of said signal.

18. An apparatus for activating a traffic presence sensor of the type based on an inductive loop, the inductive loop being adapted to have substantial mutual coupling with a closed conductive path of a vehicle frame, the apparatus comprising:
    a transformer having an explicit primary winding wherein said transformer is adapted to accept a portion of a vehicle frame as a secondary winding.

19. The apparatus according to claim 18, further comprising:
    a preselection filter.

* * * * *